United States Patent [19]

Akbar et al.

[11] Patent Number: 5,681,111

[45] Date of Patent: Oct. 28, 1997

[54] HIGH-TEMPERATURE THERMISTOR DEVICE AND METHOD

[75] Inventors: Sheikh A. Akbar; Weihua Chen; Virginia D. Patton; Ching C. Wang, all of Columbus, Ohio

[73] Assignee: The Ohio State University Research Foundation, Columbus, Ohio

[21] Appl. No.: 261,941

[22] Filed: Jun. 17, 1994

[51] Int. Cl.$^6$ ................................................ G01K 7/00
[52] U.S. Cl. ........................................ 374/185; 338/22 R
[58] Field of Search ................................ 374/183, 185; 338/22 R; 252/518

[56] References Cited

U.S. PATENT DOCUMENTS

| | | | |
|---|---|---|---|
| 3,958,209 | 5/1976 | Soda et al. | |
| 3,962,145 | 6/1976 | Matsuo et al. | |
| 4,013,592 | 3/1977 | Matsuoka et al. | |
| 4,162,631 | 7/1979 | Logothetis et al. | 374/185 |
| 4,237,732 | 12/1980 | Grein et al. | 374/183 |
| 4,259,657 | 3/1981 | Ishikawa et al. | 338/22 R |
| 4,340,508 | 7/1982 | Wahlers et al. | 338/308 |
| 4,541,898 | 9/1985 | Mase et al. | 338/22 R |
| 4,951,028 | 8/1990 | Tuller | 374/185 |
| 4,952,902 | 8/1990 | Kawaguchi et al. | 338/22 R |
| 5,212,466 | 5/1993 | Yamada et al. | 338/22 R |

FOREIGN PATENT DOCUMENTS 874882  8/1961  United Kingdom.

OTHER PUBLICATIONS

Yttria and Dysprosia as high-temperature thermistor materials; Hyde, Garrett R.; Maust, Edwin E., Jr.; Furlong, LeRoy R.; U.S. ClearinghouseFed. Sci. Tech. Inform, 1970.

Principles and Methods of Temperature Measurement, McGee, Thomas D., John Wiley & Sons, Inc., 1988.

*Primary Examiner*—William A. Cuchlinski, Jr.
*Assistant Examiner*—Andrew Hirshfeld
*Attorney, Agent, or Firm*—Kremblas, Foster, Millard & Pollick

[57] ABSTRACT

A method and apparatus for determining the temperature of an environment at an elevated temperature (i.e., one exceeding about 300° C.) wherein oxides that do not melt at such temperatures, do not age significantly at such temperatures and which have a sensitivity for such measurements are employed as thermistor resistors. Such oxides are calcium zirconate, yttria, alumina, dysprosia, magnesia, the oxide combinations alumina-silica, zirconia-silica and titania-silica. Measurements in electric current change is preferably the measurement of alternating current rather than the conventional dc current. A particularly useful instrument for such measurements consists of such a resistor with a laminate of connector metal such as diffusion bonded precious metal sheets or foils on separated surface areas as electrode connectors.

18 Claims, 12 Drawing Sheets

HIGH-TEMPERATURE THERMISTOR DEVICE AND METHOD

TECHNICAL FIELD

This invention is a device and method for accurate temperature measurement in elevated temperature environments particularly over extended periods of time where it is necessary to monitor temperature.

BACKGROUND ART

Thermistors have been widely used in both military and industrial sectors for more than 70 years due to their exceptional precision in temperature measurement and control. However, most of the applications have been limited to the temperature range of −55° to 300° C., due to the ageing behavior and various problems at the sensor/electrode interfaces. There is a definite need for manufacturing high-temperature thermistors which can extend their applications beyond 300° C.

There have been reports on the development of high-temperature thermistors in the past. The use of a complicated solid solution having a spinel-type structure was reported in U.S. Pat. No. 3,962,145, "High Temperature Thermistor Composition" to Matsuo et al. The system comprises the chemical formula of $(Mg_{[p1]}Ni_{[p2]}Co_{[p3]}Mn_{[p4]}Zn_{[p5]})(Al_xCr_yFe_{[z1]}Mn_{[z2]}Co_{[z3]}Sb_{[z4]})_2O_4$ where, $p1 + p2 + p3 + p4 + p5 = 1$,   $0 \leq pn \leq (n = 1,2,3,4,5,)$, $z1 + z2 + z3 + z4 = z$,   $0 \leq zn \leq 0.70$ $(n = 1,2,3,4)$ and $x + y + z = 1$ $0.005 \leq x \leq 0.80$, $0.003 \leq y \leq 0.95$, $0.005 \leq z \leq 0.70$ The use of a mixture of $Al_2O_3$ and $Cr_2O_3$ as high-temperature thermistor materials was reported in U.S. Pat. No. 3,958,209, "High Temperature Thermistor" to Soda et al. The targeted application temperatures between 400° C. and 1000° C. and the use of a composition $MgAl_2O_4$-$MgCr_2O_4$-$LaCrO_3$ as a high-temperature thermistor material was reported in U.S. Pat. No. 4,013,592, "High Temperature Thermistor Composition" to Matsuoka et al.

These sensor materials have sensitivities significantly higher than that of thermocouples, as shown in Table 1, but, in general lower than that of the sensors of this invention (as shown in Table 2). In Table 1 sensitivity is defined as the change in EMF (for thermocouples) or resistance (for thermistors) with a change in temperature. Normalized sensitivity is the relative change of the EMF or resistance as a function of temperature. Details of these definitions will be given hereafter.

TABLE 1

Summary of the thermal sensitivities of some thermocouples and prior known thermistor compositions.

| Sensor Type | Sensitivity at 1000° C. | Normalized sensitivity at 1000° C. (% K⁻¹) |
|---|---|---|
| Thermocouple Type K | 0.0388 mV/K | 0.094* |
| Thermocouple Type S | 0.0115 mV/K | 0.12* |
| Matsuo's | 0.049 to 959 Ω/K | 0.16 to 1.3 |
| Soda's | 0.06 to 2920 Ω/K | 0.18 to 1.29 |
| Matsuoka's | 7.34 × 10⁻⁴ to 70951 Ω/K | 0.03 to 1.18 |

*Although a type K thermocouple has slightly lower normalized sensitivity than the type S counterpart, it has much higher absolute sensitivity.

The spinel structure-based materials have relatively low melting points which limit their applications at high temperatures. All of the materials listed in the above mentioned patents suffer from serious ageing problems. The resistance of a specimen reported in the patent of Matsuo et al., for example, increased five times after being held at 1000° C. for less than forty two days under a 6-volt dc potential.

Obviously, materials showing such a large variation in resistance are not suitable for high-temperature applications. Also, all of the patents mentioned above have described a similar thermistor design with two-electrodes embedded in the sensing material. It would be very difficult, if not impossible, for this design to be used at high temperatures. For instance, differences in the thermal expansion coefficients of the sensing materials and the lead wires can easily cause cracks, and eventually lead to failure during thermal cycling, resulting in erroneous readings. Also, because of the existence of ionic conduction in the temperature range of use, conventional direct current measuring techniques would make temperature measurements practically impossible due to complications such as polarization and ageing. The electrical-resistance instabilities of the known sensing materials and the methods of their application limit their practical applications at elevated temperatures.

Thermo-sensing materials coupled with a thermistor system and device have now been devised in accordance with the present invention that precisely detect temperatures from 300° to 1800° C. The design, together with the materials, eliminates the widely existing problem of polarization in the thermistor, occurring especially at elevated temperatures because of ionic conduction, and results in improved resistivity ageing behavior with a much faster response time. The sensing materials have much higher sensitivities than all of the existing commercial thermocouples, and have exceptional oxidation and corrosion resistance, rendering a much longer operation life and more reliable temperature measurements. In addition, these materials are cost effective as compared to the thermocouple materials used at temperatures above 1300° C. Furthermore, the novel thermistor system of the present invention shows fluctuation in the measured resistance of less than 2% when tested at 1100° C. for 10 days, and at 700° C. for more than one month with a total of thirty thermal cycles from 500° to 1400° C. The observed fluctuation are attributed to temperature variations of the furnace. This invention will bring precise temperature measurement to practice at high temperatures using innovative thermo-sensing materials, a new high-temperature thermistor fabrication technique, and a novel read-out device.

BRIEF DISCLOSURE OF INVENTION

This invention relates to the development and application of chemical compositions, systems and device design for thermistors used at temperatures above 300° C. All of the compositions are metal oxides. Their thermal sensitivities are, in general, much higher than those of commercial thermocouples at all temperatures. At 1000° C., the sensitivity of calcium zirconate, for instance, is 7,000 Ω-cm/K as compared with 0.039 mV/K for type K thermocouples. Even on a normalized scale, the sensitivity of calcium zirconate is thirteen times higher than that of the thermocouple. The sensitivity is even larger at lower temperatures. As shown in Table 2 below yttria, alumina, dysprosia, magnesia and the oxide combinations alumina-silica and zirconia-silica exhibit sensitivities higher than those of commercial thermocouples and provide the advantages over all prior known thermistors when employed in conjunction with the system and device of the present invention. The oxide combination titania-silica also possesses sensitivity useful for some applications.

The present system and device provides a novel design for measuring and read-out. For its electric current characteristics measurement it preferably uses an alternating current power source with a designated frequency instead of a conventional dc power source. This design promotes contribution from all of the charge carriers and eliminates polarization at the material/electrode interface. Furthermore, the system shows much shorter response times compared to conventional designs using dc power sources. In a conventional design, only thermal response time has to be considered, i.e., the time required for the entire sensor material to reach thermal equilibrium with the surrounding environment. This is true only for an electronic conductor where the response time is determined by the size, configuration, and surrounding conditions of the sensor. For an ionic or mixed conductor, however, the response time is not determined by the thermal response time alone. Even at thermal equilibrium, the sensor may have a response time on the order of a few hours if the conventional dc techniques are used. This corresponds to the time for the sensor to reach an electrical equilibrium when an electrical field is applied. The electrical response time depends upon the sensor's composition, temperature, surrounding conditions, applied dc voltage, etc. This slow response limits the applications of the sensor using a conventional dc technique. The novel technique of the present invention employs an ac signal with a carefully selected frequency, leading to a significant reduction in the response time and polarization problems.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the word connected or terms similar thereto are often used. They are not limited to direct connection but include connection through other circuit elements where such connection is recognized as being equivalent by those skilled in the art.

DETAILED DESCRIPTION

All of the samples presented to illustrate this invention were prepared from high purity (>99.99%), fine particle (size <5 μm) oxide powders. Predetermined amounts of the powders were weighed to obtain the desired compositions. They were wet mixed in isopropyl alcohol using a ball mill for 24 hours. The mixture was dried at 120° C. for 6 hours followed by grinding for homogenization. The powder was heated at temperatures ranging from 1000° to 1400° C. in air for 12 hours, cooled to room temperature and reground. This process was repeated twice. The powder was then pressed into disk-shaped specimens 9 mm in diameter and 1.5 mm in thickness. The specimens were pressed at approximately 5000 lb for 2 minutes and sintered in air at 1550° C. for 48 hours.

The dc electrical resistance measurements were performed using an HP pA Meter/DC Voltage Source (Hewlett Packard Model 4140B). The impedances of the samples were obtained using both an HP Impedance Analyzer (Hewlett Packard Model 4192A) and a Lock-in-Amplifier (Stanford Research Systems Model SR510). Platinum-foil electrodes were welded to the flat surfaces of the specimen with the help of conductive platinum paste (Engelhard, N.J.) and to platinum wires before experimentation. The electrodes may be made of any high temperature conductive materials such as nobel metals and their alloys, molybdenum disilicide, silicon carbide etc. Both the two- and four-probe techniques were used to measure the electrical resistance. No noticeable difference in the measured resistance was found between the two techniques. The data reported in this invention are those obtained by using the two-probe technique, measured in air at the indicated temperatures. The resistance measured using the Stanford Research Systems lock-in-amplifier is the impedance at a frequency of 100 Hz. Values of the resistances measured using the dc power source were found to increase with time at a given temperature. The resistance increased rapidly at the beginning but slowly approached a constant value. The time required to reach the constant value depended mainly upon the sensing material, the temperature, the surrounding gasses, etc. The dc resistance data presented in this invention are the steady values for the given temperatures. All of the systems of the present inventions (i.e. the oxides of Table 2) have negative temperature coefficients of resistivity (i.e. their electrical resistivities have similar temperature dependencies).

Figure 1:
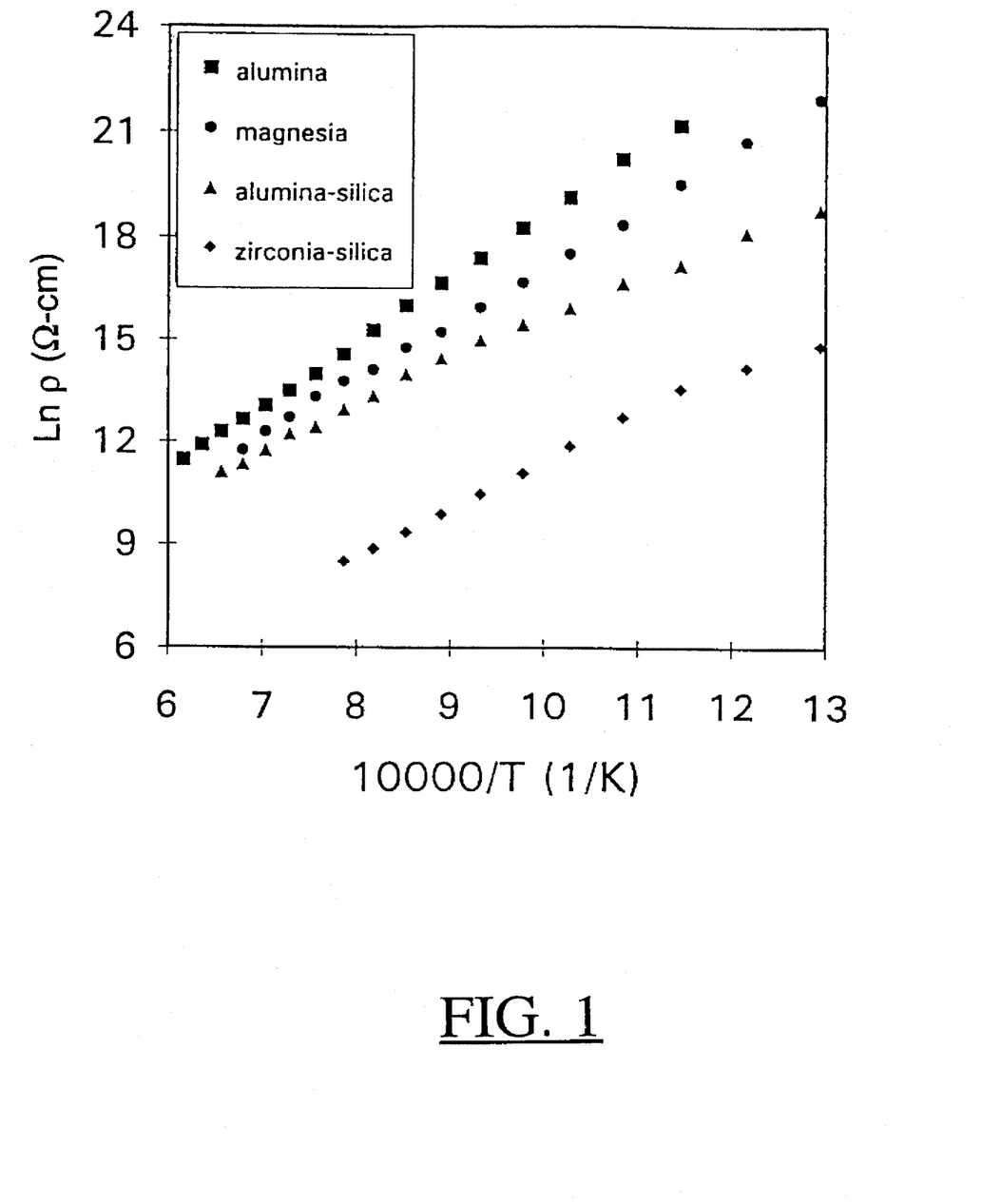
FIG. 1 is a graph showing the temperature dependence of dc electrical resistivities of certain oxide systems.

FIG. 1 shows the temperature dependence of the dc electrical resistivities of alumina, magnesia and two-phase mixtures of alumina-silica and zirconia-silica (the compositions set forth in Table 2). The dc resistivities of calcium zirconate, yttria, and dysprosia also show similar temperature dependencies. The resistivity was calculated directly from the resistance and the specimen dimensions without correcting for the porosity of the specimen. A linear relationship of the natural logarithm of resistivity versus reciprocal temperature was observed for alumina, magnesia, calcium zirconate, yttria, and dysprosia; two slopes were found for the silica-containing mixtures. All of the data can be fit to the following equations with a correlation efficient greater than 0.99 using the least-squared method:

$$\ln(\rho) = a + b(1/T) \tag{1}$$

where, a and b are constants obtained from the intercept and slope, respectively. Hence, the resistivity, ρ (Ω-cm), can be converted to an exponential form of the familiar Arrhenius-type equation:

$$\rho = A \exp(Q/kT) \tag{2}$$

where, Q is the activation energy of conduction (Q=kb), k is the Boltzmann constant, T is the temperature in K, and A is the pre-exponential term (A=$e^a$). Normalized thermal sensitivities, namely temperature coefficient of resistance (TCR), can be calculated using the definition:

$$\alpha = (1/R) * \partial R/\partial T \tag{3a}$$

or $$\alpha = (1/\rho) * \partial \rho/\partial T \tag{3b}$$

From equations (2) and (3b), one obtains:

$$\alpha = Q/k(1/T^2) \tag{4}$$

TABLE 2

Summary of the results of some oxide systems investigated.

| Composition | Q (eV) | A | s (Ω-cm/K) | α % |
|---|---|---|---|---|
| $Y_2O_3$ | 2.3 | $7.4 \times 10^{-4}$ | 16,000 | 1.7 |
| $CaZrO_3$ | 2.2 | $8.6 \times 10^{-4}$ | 7,000 | 1.6 |
| $Al_2O_3$ | 1.6 | $2.5 \times 10^{-1}$ | 6,500 | 1.2 |
| $Dy_2O_3$ | 1.5 | $1.3 \times 10^{-1}$ | 3,000 | 1.1 |
| MgO | 1.4 | $6.6 \times 10^{-1}$ | 2,300 | 1.0 |
| 47% $TiO_2$- 53% $SiO_2$ | 0.7 T < 826° C. 0.9 T > 826° C. | 984 T < 826° C. 58.2 T > 826° C. | 1,030 | 0.7 |
| 70% $Al_2O_3$- 30% $SiO_2$ | 1.0 T < 840° C. 1.3 T > 840° C. | 110 T < 840° C. 3.7 T > 840° C. | 1,000 | 0.9 |
| 68% $ZrO_2$- 32% $SiO_2$ | 1.3 T < 600° C. 0.7 T > 600° C. | 0.04 T < 600° C. 42.9 T < 600° C. | 103 | 0.9 |

The value of normalized sensitivity may be misleading because it only reveals a relative change in a variable, either resistance for thermistors or EMF for thermocouples, as a function of temperature. For example, it is recommended that the type K thermocouple, with a sensitivity of 0.0388 mV/K, shown in Table 1., be used to measure temperatures around 1000° C. instead of a type S with a sensitivity of 0.0115 mV/K; even though the normalized sensitivity of a type K, 0.094%, is less than that of type S, 0.12%. Sensitivity of a thermistor, s, is defined as the change in resistivity with temperature and can be calculated mathematically as follows:

$$s = \partial \rho/\partial T \tag{5}$$

It can be presented based upon equations (2) and (4) as:

$$s = AQ\exp(Q/kT)/kT^2 \tag{6}$$

The activation energy Q, pre-exponential constant A, sensitivities, and normalized sensitivity, α, at 1000° C. for the various compositions are summarized in Table 2.

Zirconia itself does not possess preferred thermal sensitivity and electrical resistivity properties required for high temperature thermistor applications. However, it has been found that the combination of zirconia with silica provides enhanced density that has such preferred properties. It is believed silica forms a coating around the sintered zirconia particles filling the voids to enhance densification and provide a protective coating against environmental degradation. Any mixing of silica powder with zirconia will enhance its properties and usefulness as a high temperature thermistor material although from about 5% by weight to 35%, by wt., would be expected to be desirable.

Alumina, as has been shown, has excellent thermal sensitivity and electrical resistivity properties. Additions of silica to alumina enhances such properties for some thermistor applications as is shown by Table 2 and FIG. 1. The addition of silica to alumina in amounts of from 5% to 35%, by wt., would be expected to be advantageous.

The metal oxide combination of titania-silica has also been found to possess enhanced sensitivity. A range of from about 5% to 60%, by weight, $SiO_2$ would be expected to be effective.

Figure 2:
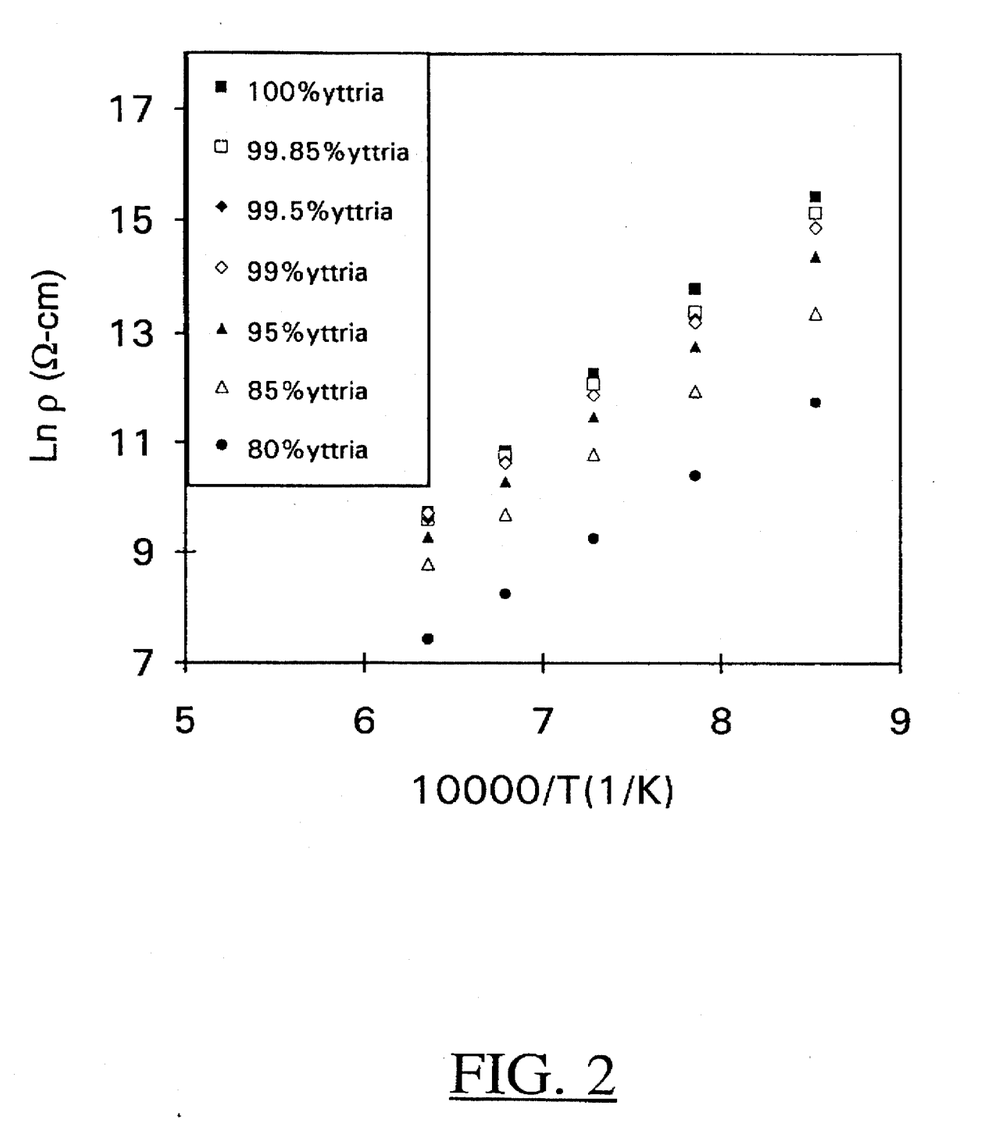
FIG. 2 is a graph showing the change of temperature dependence of resistivity of yttria when doped with zirconia.

For each oxide system, the value of Q, s and α can be adjusted by doping with other oxides. FIG. 2 shows the change of temperature dependence of resistivity of yttria when doped with 0.15% to 20% of zirconia ($ZrO_2$); the corresponding activation energy and sensitivity for each composition are listed in Table 3. The values of sensitivity at 500° C., 1000° C. and 1300° C. are given to show the temperature dependence of sensitivity.

TABLE 3

Oxide systems adjusted by doping with $ZrO_2$.

| Composition | Activation Energy (eV) | Sensitivity at 500° C. (ohm-cm/K) | Sensitivity at 1000° C. (ohm-cm/K) | Sensitivity at 1300° C. (ohm-cm/K) |
|---|---|---|---|---|
| 100% $Y_2O_3$ | 2.30 | $2.68 \times 10^{10}$ | $1.6 \times 10^4$ | $1.8 \times 10^2$ |
| 99.85% $Y_2O_3$ 0.15% $ZrO_2$ | 2.20 | $1.08 \times 10^{10}$ | $1.0 \times 10^4$ | $1.5 \times 10^2$ |
| 99.5% $Y_2O_3$ 0.5% $ZrO_2$ | 2.11 | $4.86 \times 10^9$ | $8.6 \times 10^3$ | $1.5 \times 10^2$ |
| 99% $Y_2O_3$ 1% $ZrO_2$ | 2.00 | $2.08 \times 10^9$ | $7.6 \times 10^3$ | $1.6 \times 10^2$ |
| 95% $Y_2O_3$ 5% $ZrO_2$ | 1.90 | $7.82 \times 10^8$ | $4.7 \times 10^3$ | $9.6 \times 10^1$ |
| 85% $Y_2O_3$ 15% $ZrO_2$ | 1.76 | $1.51 \times 10^8$ | $2.0 \times 10^3$ | $5.4 \times 10^1$ |
| 80% $Y_2O_3$ 20% $ZrO_2$ | 1.70 | $2.15 \times 10^7$ | $4.0 \times 10^2$ | $1.3 \times 10^1$ |

Figure 3:
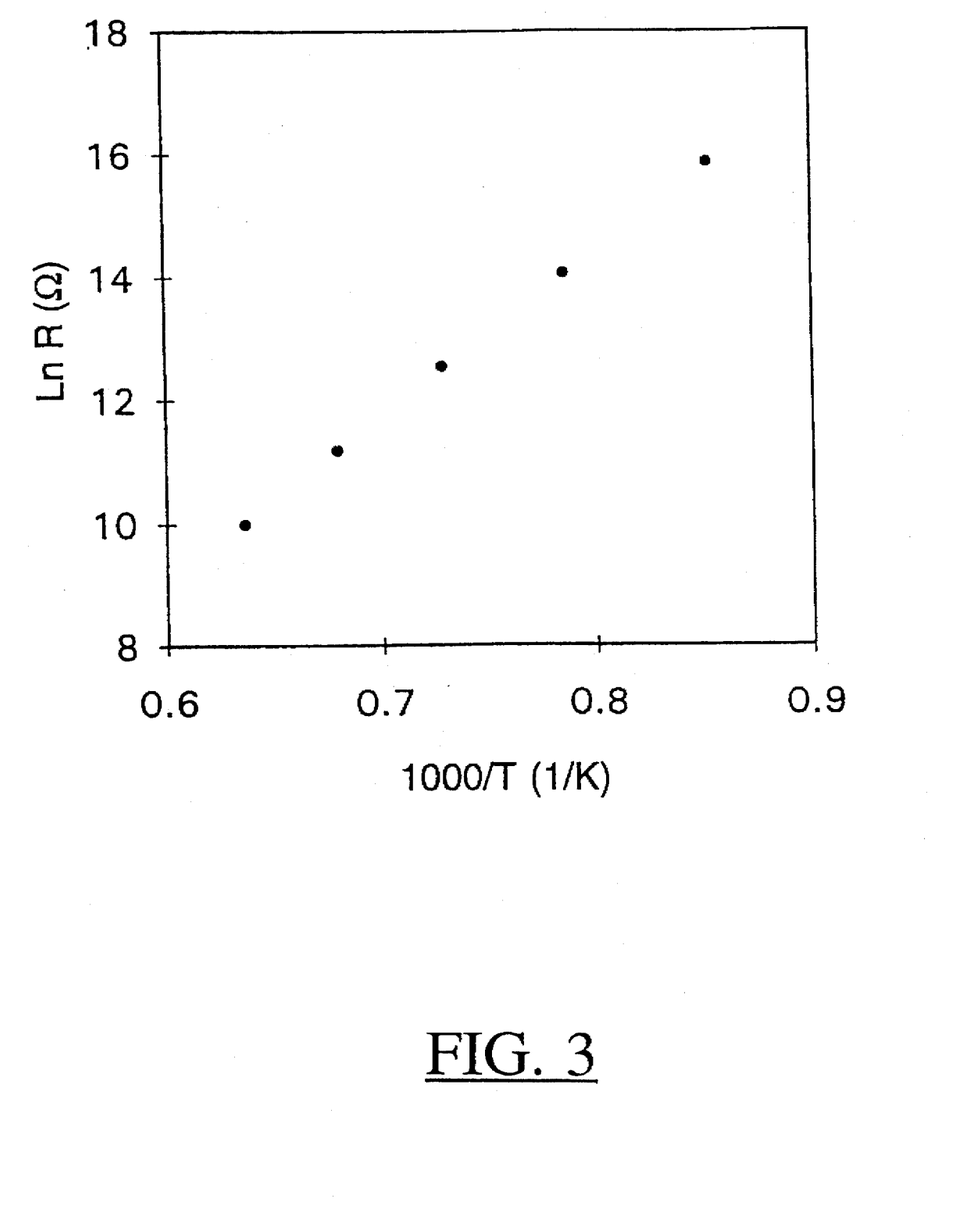
FIG. 3 is a graph showing the temperature dependence of the ac resistance of an alumina sample at 1000° C. in air.

FIG. 3 depicts the temperature dependence of the resistivity of an alumina specimen measured with an ac power source at a frequency of 100 Hz. A linear relationship between the natural log of resistivity and reciprocal absolute temperature is observed as in the case of FIG. 1. It should be noted that, due to interference from the furnace, the resistance reading fluctuates by as much as 50% or more if a dc power source is used for the measurement. The fluctuation is larger at lower temperatures. This problem, however, does not appear when an ac power source is used, as reported in FIG. 3. Hence, it is crucial to use either an ac source to measure the resistance or an appropriate grounding technique, if the thermistor is to be designed to monitor temperatures in an ac-powered furnace.

Figure 4A:
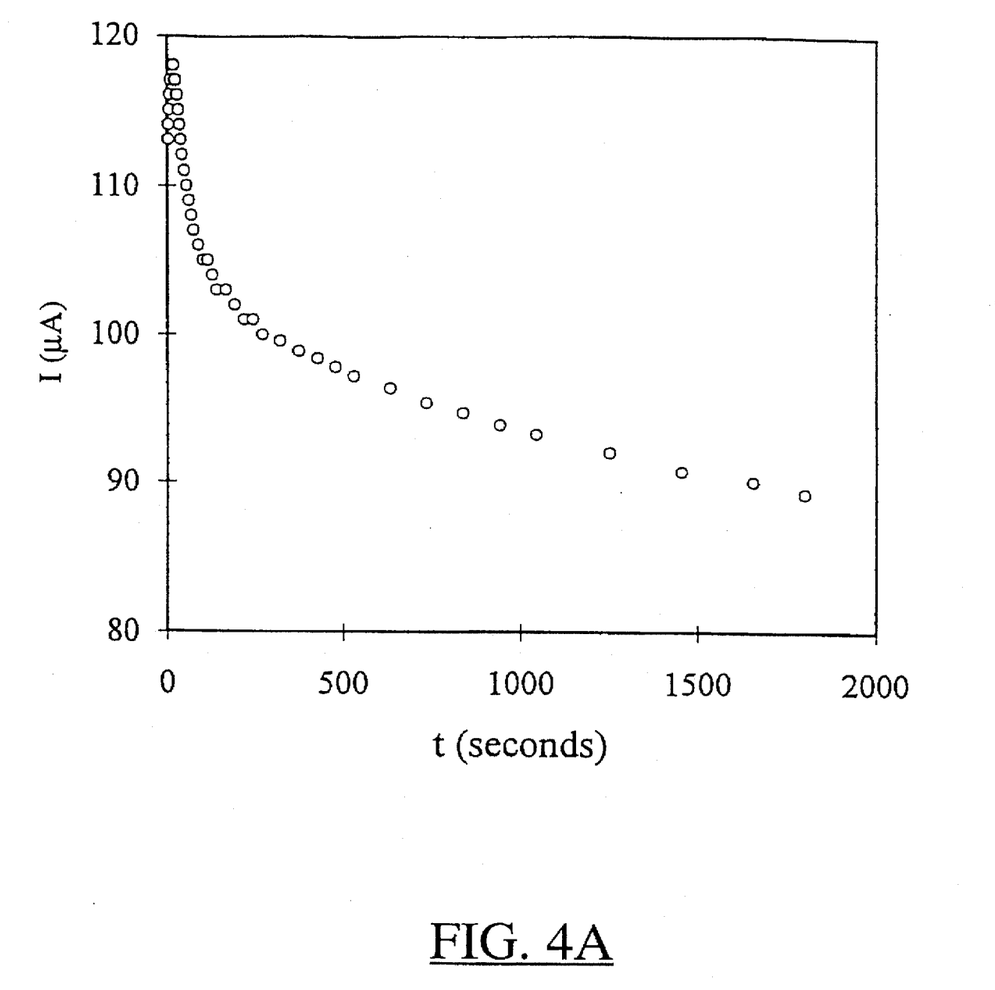
FIGS. 4(a) and 4(b) are graphs showing the electrical transient behavior of a calcium zirconate sample at 1000° C. in air under a dc potential of 5 volts (a) and under an ac potential (b).
Figure 4B:
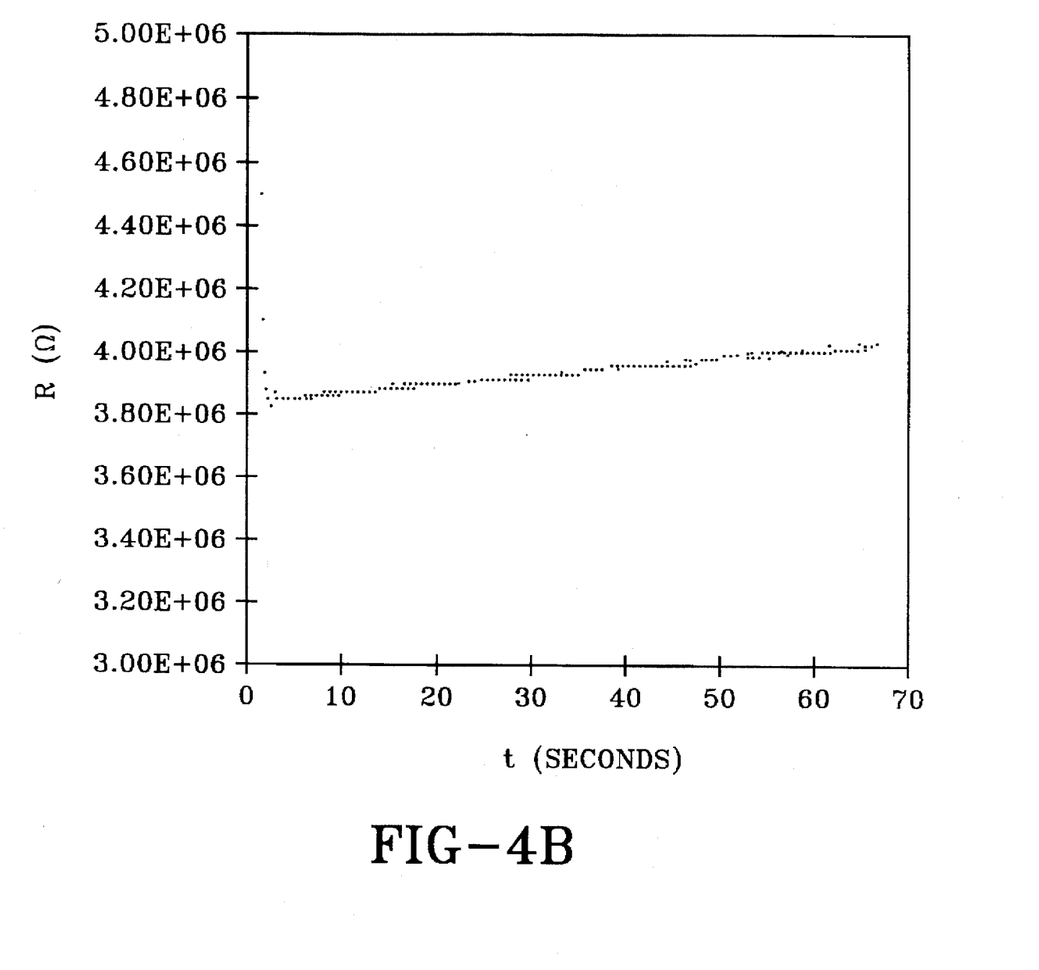

The response time of a sensor is crucial for many applications. For transient conditions, the governing equation for the thermal equilibrium of a sensor in relation to the surrounding environment is represented as:

$$CdT/dt + k_t(T-T_a) = P \quad (7)$$

where, C is the heat capacity of the sensor, $k_t$ is the thermal conductance or dissipation constant (determined by both the configuration of the sensor and its operation environment), $T_a$ is the ambient temperature, and P is the thermal power consumed by the sensor, which numerically equals to the product of current and voltage. The resistance of a thermistor at a given temperature depends not only on the thermal equilibrium but also on the electrical equilibrium. For example, electrical equilibrium was not reached after 30 minutes for a thermally equilibrated calcium zirconate-based thermistor under a dc potential of 5 volts, as revealed in FIG. 4(a). Under ac conditions, electrical equilibrium was achieved almost instantly when a potential of an appropriate amplitude was applied, as shown in FIG. 4(b), and the data show a random fluctuation of about 0.5% of the average value. The small increase in resistance with time is caused by a decrease in the furnace temperature because the furnace was turned off before the measurements began. Therefore, in temperature monitoring and/or control applications, transient behavior or response time of an ac powered thermistor is mainly determined by the thermal-equilibrium process. However, when a dc power source is used, both the electrical equilibrium and thermal equilibrium can contribute to the response time.

Figure 5A:
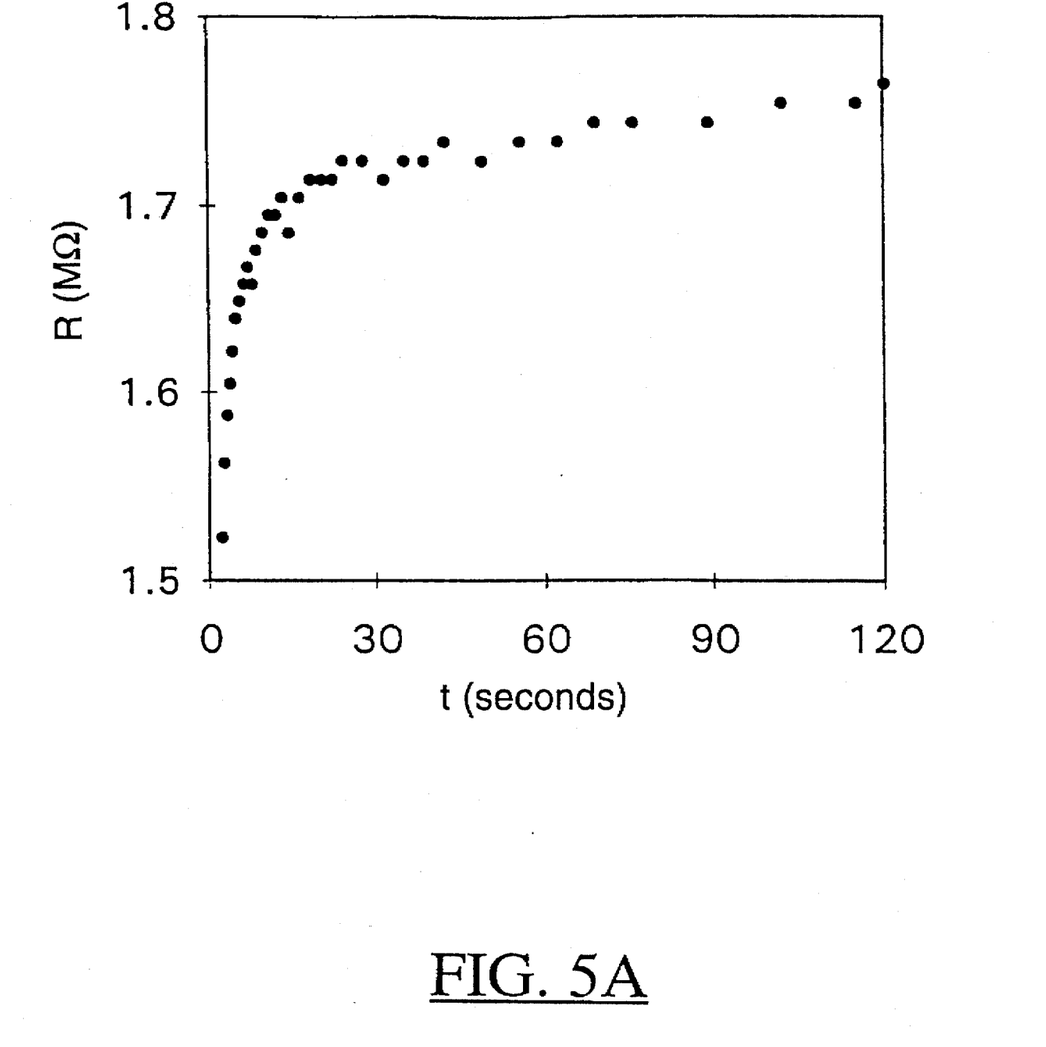
FIGS. 5(a) and 5(b) are graphs showing the electrical resistance of an alumina sample at 1000° C. in air under a 0.1 volt electrical potential for (a) dc and (b) ac at 100 Hz.
Figure 5B:
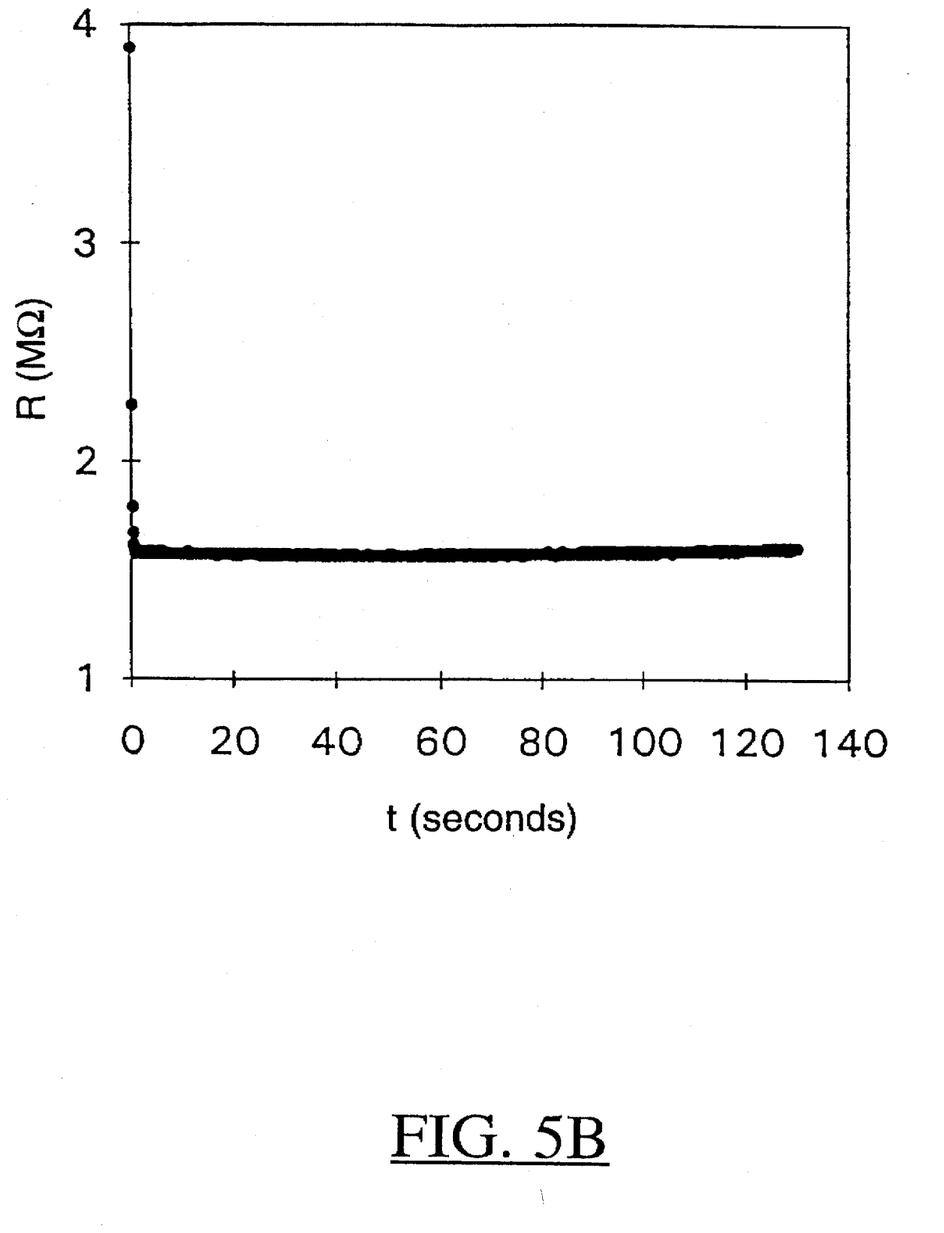

FIG. 5(a) shows such a phenomenon for an alumina-based thermistor, where the electrical resistances increase monotonically as a function of time even though the sensor is at thermal equilibrium with its surroundings. This shows that the current, passing through the sensor under an applied constant dc voltage of 0.1, continues to decrease, even after 1 minute. In contrast, the same sensor reaches a constant current after a fraction of a second when an ac electric potential is applied, as shown in FIG. 5(b). The data also show a random fluctuation which is attributed to the electrical interference of the furnace. The fluctuation vanishes if the furnace is turned off, as shown in FIG. 4(b). Obviously, one must use an ac signal to measure the electrical resistance for application requiring a fast response time. Response time for different materials varies, in general, as shown in FIG. 4(b) and 5(b), respectively. Based on this study, the response time is also found to depend on the temperature.

Figure 6A:
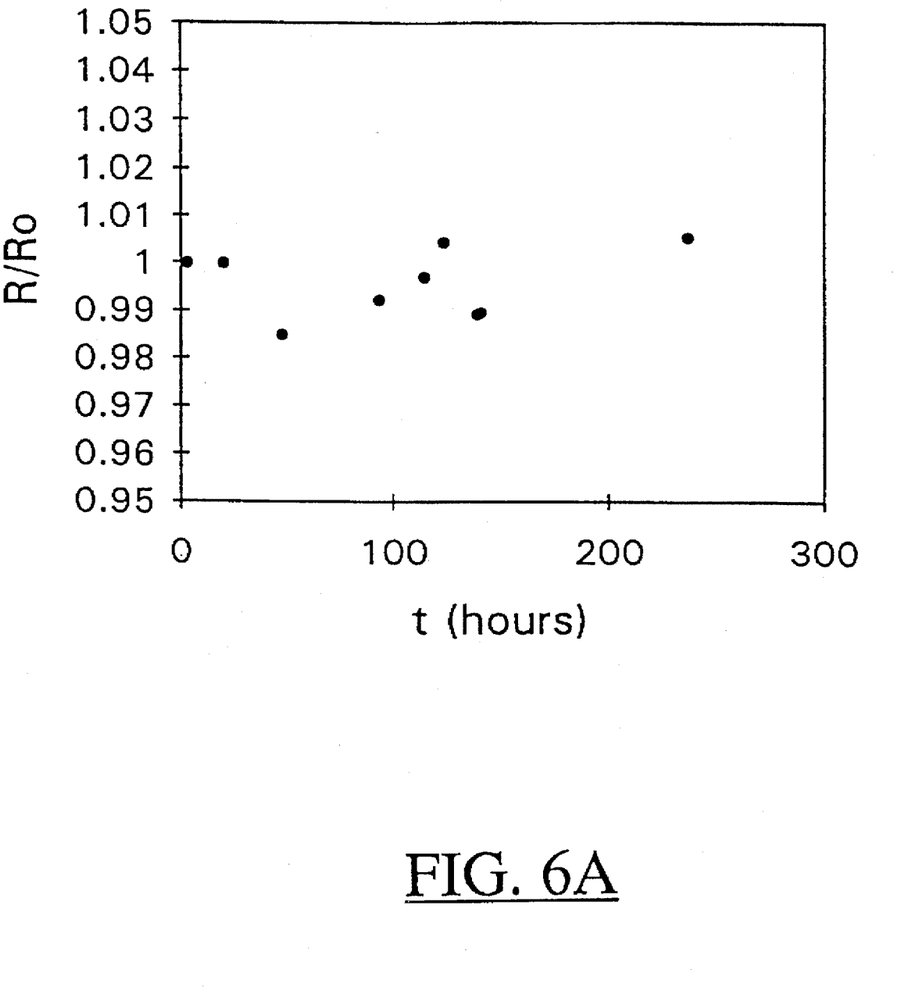
FIGS. 6(a) and 6(b) are graphs showing the ageing behavior of an alumina sample at 1000° C. in air under a 0.1 volt electrical potential for (a) ac at 100 Hz and (b) dc.
Figure 6B:
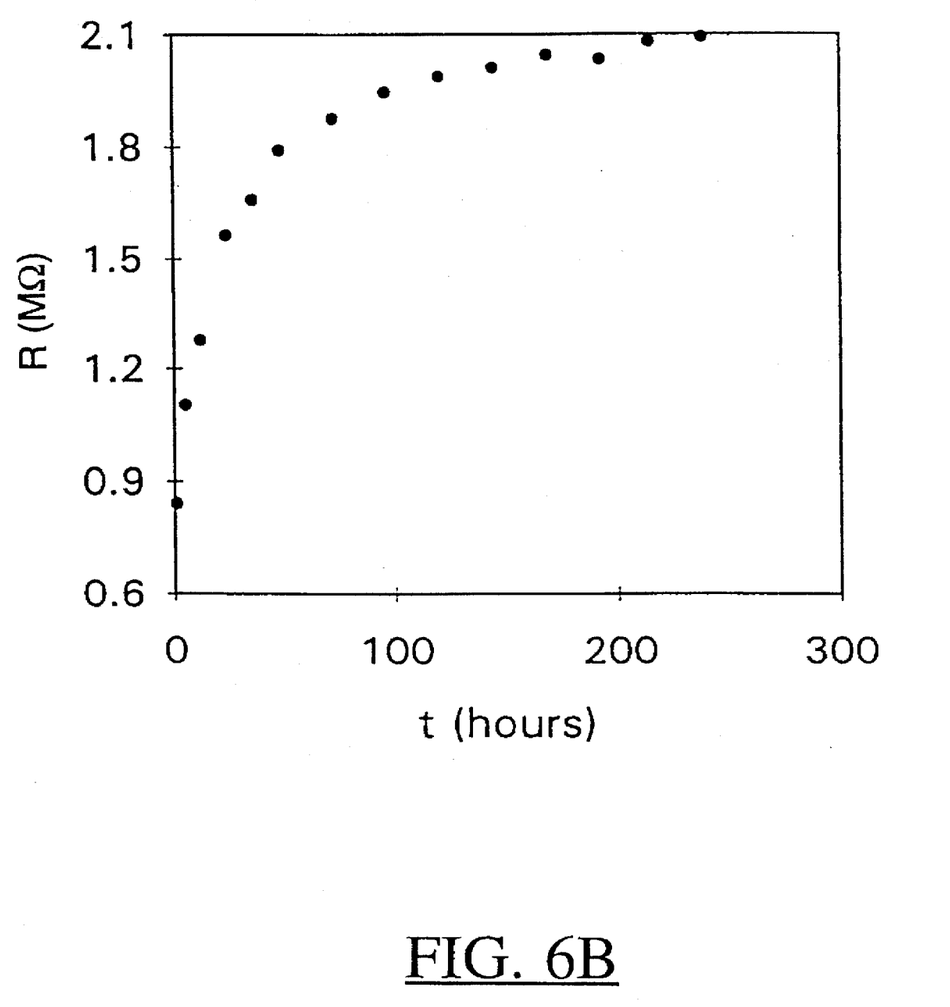

To evaluate the reliability and stability of the materials, the variation of the resistivity at a given temperature in a constant environment (in air) for an extended time period and over several thermal cycles was investigated. FIG. 6(a) reveals that the resistance shift (ΔR) from the initial measurements (resistivity $R_o$ at time $t_o$) of an alumina specimen at 1000° C. under an ac power source is less than 2% for the entire time period of 10 days. FIG. 6(b) shows the resistance shift of an alumina sample under a dc potential of 0.1 volt. The resistance increases with time during the first 8 days. It increases quickly during the first 2 days, but then slows down, and finally approaches a constant value after 7 days. This phenomenon occurs during each thermal cycle, possibly due to nonequilibrium of the defects at grain boundaries and in grains. This increase in dc resistance at a constant temperature and atmosphere makes the use of the conventional dc technique very difficult for high-temperature thermistors. In contrast, under ac conditions this variation is negligible. This is essential for practical thermistor applications.

Figure 7A:
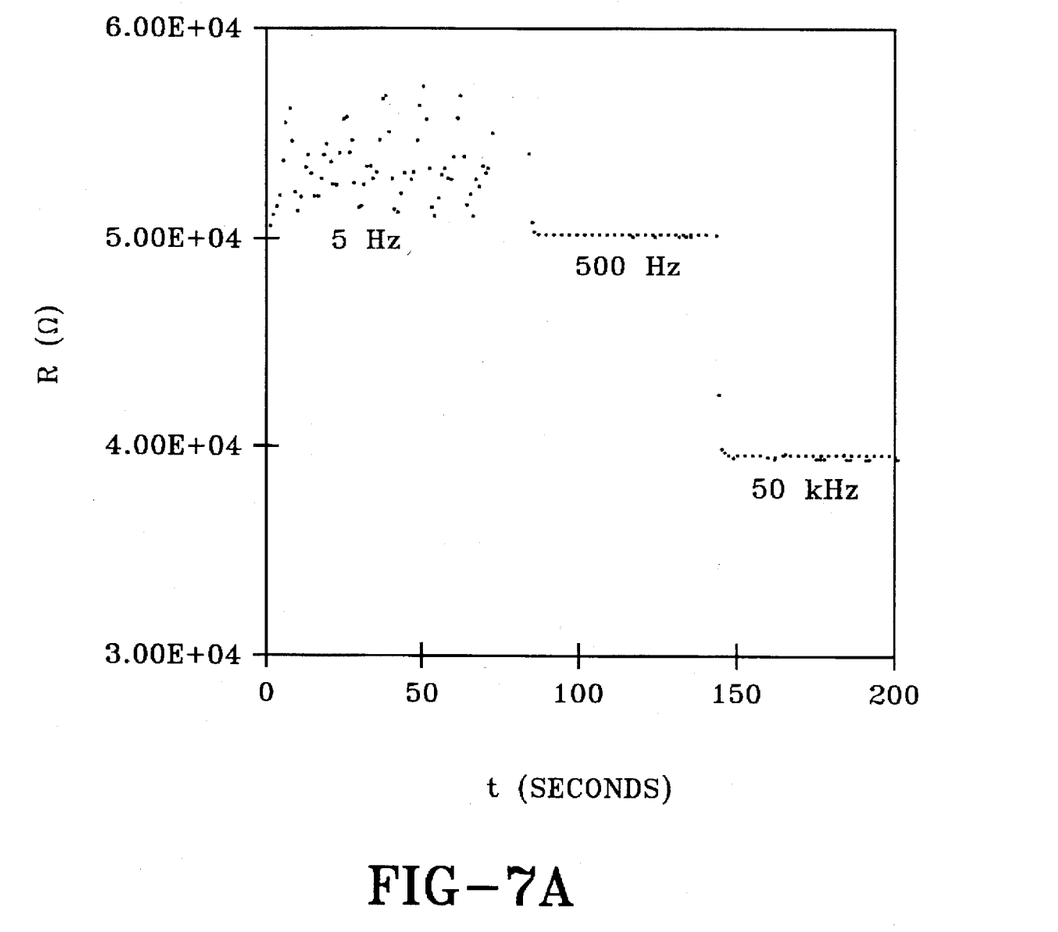
FIGS. 7(a) and 7(b) are graphs showing the electrical resistance of a calcium zirconate sample (a) for frequencies of 5,500 and 50,000 Hz at 1000° C. and (b) at different temperatures.
Figure 7B:
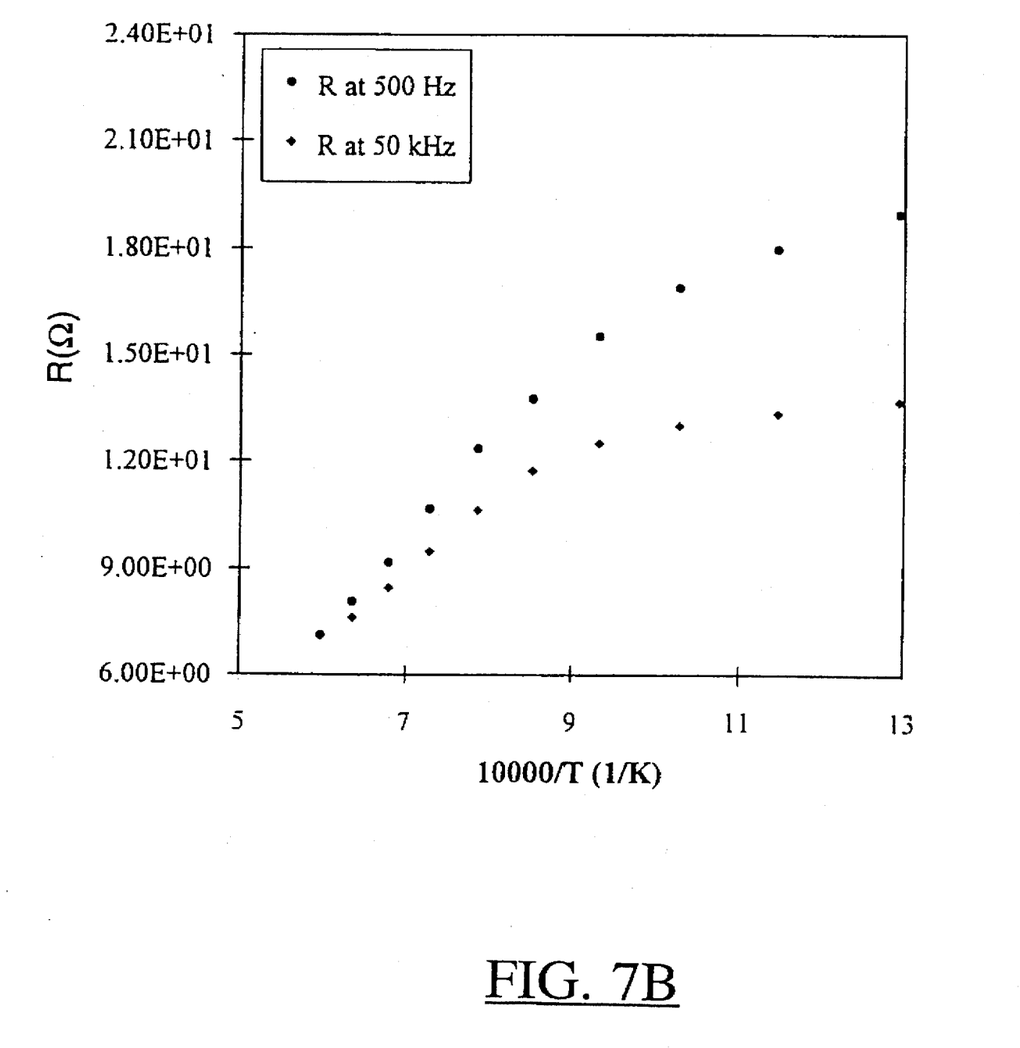

Frequency of the ac power source must be determined in order to measure the temperature accurately. It was found that at low frequencies, the resistance fluctuated significantly as shown in FIG. 7(a), giving uncertainties in the measurements. At higher frequencies, the fluctuation diminishes; however, the sensitivity is depressed at a lower temperature range as shown in FIG. 7(b). Therefore, an optimum frequency range must be determined in order to achieve the highest possible sensitivity.

Figure 8:
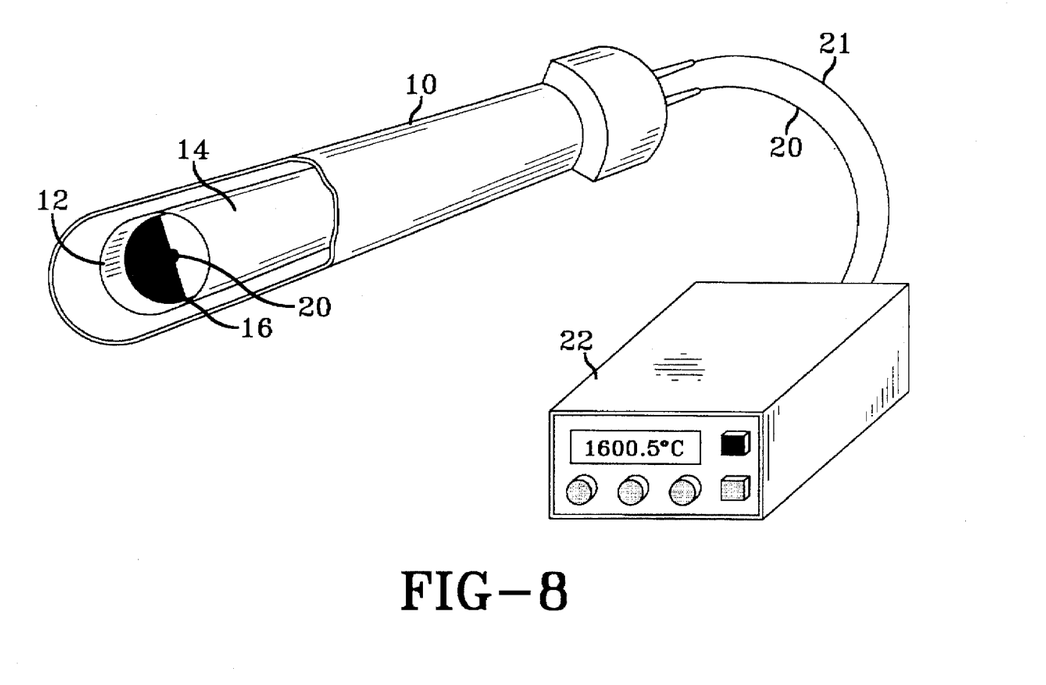
FIG. 8 is an illustrative schematic representation of a prototype high-temperature thermistor designed to accomplish the purpose of the present invention.
Figure 9:
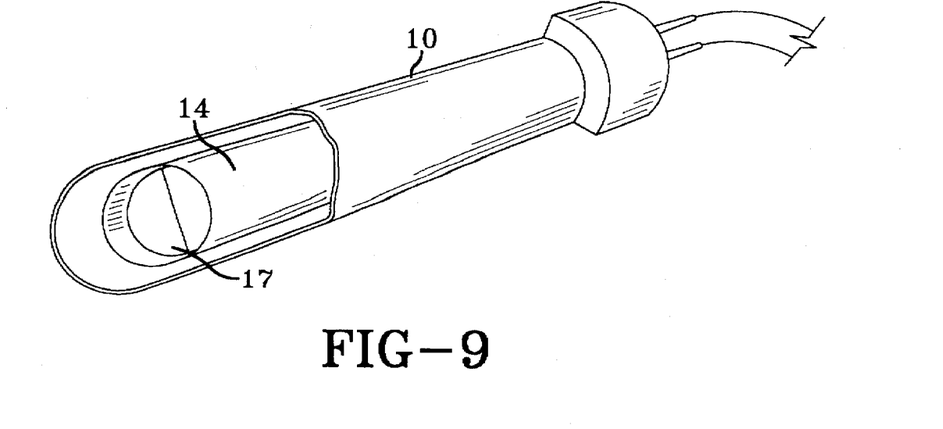
FIG. 9 is a cut-away section of the thermistor of FIG. 8.

FIG. 8 shows a design of the thermistor probe 10. The thermo-sensing material 12 is mounted to the end of a ceramic tube 14 that is positioned within a protective housing 15 (broken away to show tube 14). The active sensor or sensing material 12 is located at the hot end of the tube 14 and is directly exposed to the environment in which the temperature is to be monitored. The sensor material 12 is joined to two thin platinum electrodes 16 and 17 via diffusion bonding (electrode 17 is hidden from view), forming a sandwich structure. This configuration can reduce the stress arising from thermal mismatch because of the relative ease of deformation of the thin Pt foils. This, therefore, renders it a higher reliability as compared with the design proposed in the patents discussed earlier. The lead wires 20 and 21 are housed within the tube 14. The cold end of the tube 14 is located outside of the high temperature region and is connected to a read-out device 22. This device uses an ac signal to measure the impedance of the sensing material. As discussed earlier, the use of an ac signal is important for high-temperature thermistors in which ionic conduction plays a role in the overall electrical conductivity. Using the compositions listed in Table 2 and using the device proposed here, a rugged, reliable, precise, and cost-effective high-temperature measurement device can be manufactured.

The device of FIG. 8 is a preferred embodiment. It is obvious that for some applications it may not be necessary for electrodes 16 and 17 to form a sandwich structure but merely be separately attached to the surface of the thermo-sensing material 12 so that ac current flows through the probe. As stated above, the electrodes may be fabricated from any high temperature conductive materials such as nobel metal, platinum, and their alloys, molybdenum disilicide, silicon carbide, etc. Such electrodes may be bonded by any conventional bonding method that will achieve intimate contact between the electrodes and the sensing material surfaces (pressure bonding, welding, diffusion bonding, etc). Diffusion bonding is preferred.

This invention will lead to the manufacture of a stable, precise, reliable, cost-effective and rugged thermistor for use at temperatures above 300° C. Some of the salient features of the device are:

Superior sensitivity as compared to that of commercial thermocouples

Accurate measurement of temperatures up to 1800° C. or higher

Excellent stability rendering very good oxidation and corrosion resistance

Very good mechanical strength even at elevated temperatures

Good tolerance against thermal Shock

Tailored resistance range (via doping) for particular application to ensure high accuracy and a simple and reliable read-out device Reduced ageing and limited polarization, translating into high stability and long device life Low cost While certain preferred embodiments of the present invention have been disclosed in detail, it is to be understood that various modifications may be adopted without departing from the spirit of the invention or scope of the following claims.

We claim:

1. A method for determining the temperature of an environment at an elevated temperature comprising:

a) providing a resistor comprising at least one metal oxide having a melting point that is higher than said elevated temperature and an electric current sensitivity;

b) applying an alternating electric current bias to said resistor and correlating the changes in the current characteristics with temperature when said resistor is exposed to varying temperatures; and c) exposing said resistor to said environment and determining the temperature of said environment by said correlating.

2. The method of claim 1 wherein step b) is accomplished by bonding the surfaces of the resistor with the flat surfaces of two separated flat sheets of high temperature conductive material to which electric current carrying leads are attached for the application of said bias.

3. The method of claim 2 wherein said resistor and bonded flat sheets form a sandwich structure through which said ac current bias is applied.

4. The method of claim 3 wherein said flat sheets are constructed of platinum.

5. The method of claim 2 wherein said flat sheets are fusion bonded to said resistor.

6. The method of claim 1 wherein at least one metal oxide is selected from the group consisting of calcium zirconate, yttria, alumina, dysprosia, magnesia, the metal oxide combination alumina-silica, the metal oxide combination zirconia-silica and the metal oxide combination titania-silica.

7. The method of claim 6 wherein said current characteristics is impedance.

8. The method of claim 1 wherein said alternating current has a frequency in a range from about 50 hertz to about 50,000 hertz.

9. The method of claim 1 wherein said metal oxide is calcium zirconate.

10. The method of claim 1 wherein said metal oxide is yttria.

11. The method of claim 1 wherein said metal oxide is alumina.

12. The method of claim 1 wherein said metal oxide is dysprosia.

13. The method of claim 1 wherein said metal oxide is magnesia.

14. The method of claim 1 wherein said metal oxide is the oxide mixture of $SiO_2$ and $Al_2O_3$.

15. The method of claim 1 wherein said metal oxide is the oxide mixture of $SiO_2$ and $ZrO_2$.

16. The method of claim 1 wherein said metal oxide is the oxide mixture of $SiO_2$ and $TiO_2$.

17. The method of claim 1 wherein said resistor is doped with another oxide.

18. The method in accordance with claim 1, wherein said metal oxide is $Y_2O_3$ doped with $ZrO_2$.

* * * * *